(12) United States Patent
Yoon

(10) Patent No.: US 6,742,400 B2
(45) Date of Patent: Jun. 1, 2004

(54) DEVICE AND METHOD FOR MEASURING CROSS-INERTIA-MOMENT IN LIMITED ANGULAR ROTARY AXIS

(75) Inventor: Si-Young Yoon, Songnam-shi (KR)

(73) Assignee: Samsung Thales Co., Ltd., Kumi-shi (KR)

(*) Notice: Subject to any disclaimer, the term of this patent is extended or adjusted under 35 U.S.C. 154(b) by 0 days.

(21) Appl. No.: 10/315,839

(22) Filed: Dec. 10, 2002

(65) Prior Publication Data

US 2003/0213303 A1 Nov. 20, 2003

(30) Foreign Application Priority Data

May 20, 2002 (KR) ........................................ 2002-27855

(51) Int. Cl.[7] ............................... G01D 7/00; G01L 5/16
(52) U.S. Cl. .................................................. 73/862.043
(58) Field of Search ..................... 73/862.041–862.044

(56) References Cited

U.S. PATENT DOCUMENTS

| | | | | |
|---|---|---|---|---|
| 3,613,443 A | * | 10/1971 | Curry ........................... | 73/147 |
| 3,640,130 A | * | 2/1972 | Spescha et al. ......... | 73/862.043 |
| 3,824,674 A | * | 7/1974 | Inoyama et al. ......... | 29/407.05 |
| 3,948,093 A | * | 4/1976 | Folchi et al. ........... | 73/862.044 |
| 3,988,934 A | * | 11/1976 | Kamphoefner et al. .... | 73/865.4 |
| 4,094,192 A | * | 6/1978 | Watson et al. .......... | 73/862.044 |
| 4,428,225 A | * | 1/1984 | Kato et al. ............... | 73/65.01 |
| 4,706,506 A | * | 11/1987 | Lestelle .................. | 73/862.044 |
| 4,849,730 A | * | 7/1989 | Izumi et al. .................... | 338/2 |
| 5,029,483 A | * | 7/1991 | Gautschi et al. ........ | 73/862.622 |
| 5,063,788 A | * | 11/1991 | Ch'Hayder et al. ..... | 73/862.043 |
| 5,859,372 A | * | 1/1999 | Neltoft ................... | 73/862.043 |
| 6,354,155 B1 | * | 3/2002 | Berme ................... | 73/862.043 |
| 6,424,148 B1 | | 7/2002 | Burns ......................... | 324/207 |

* cited by examiner

*Primary Examiner*—Hezron Williams
*Assistant Examiner*—John Hanley
(74) *Attorney, Agent, or Firm*—Cha & Reiter, L.L.C.

(57) ABSTRACT

The present invention relates to measurement of cross-inertia-moment in a limited angular rotatory axis, and more specifically, to a measuring device and method of cross-inertia-moment in a limited angular rotatory axis. The measuring device includes a base plate; a pair of first supporters, each end portion being secured on the base plate through a load cell, for supporting a first rotatory axis; a second supporter installed inbetween the pair of first supporters to be able to rotate round the first rotatory axis, for supporting a second rotatory axis that is orthogonal to the first rotatory axis; and a roller installed at the inside of the second supporter, being rotatable round the second rotatory axis. Therefore, the present invention enables to measure and amend the cross-inertia-moment of multiple axis LOS (line of sight) stabilizer as well as low speed rotatory machinery. The present invention is also effective for minimizing the interference of the cross-inertia-moment due to the inertia in a precision stabilizer like the multiple axis LOS stabilizer, consequently improving the precision of the multiple axis LOS stabilizer

4 Claims, 3 Drawing Sheets

DEVICE AND METHOD FOR MEASURING CROSS-INERTIA-MOMENT IN LIMITED ANGULAR ROTARY AXIS

CLAIM OF PRIORITY

This application makes reference to and claims all benefits accruing under 35 U.S.C. Section 119 from an application entitled, "Measuring device and method of cross-inertia-moment in limited angular rotary axis", filed in the Korean Industrial Property Office on May 20, 2002 and there duly assigned Serial No. 2002-27855.

BACKGROUND OF THE INVENTION

1. Field of the Invention

The present invention relates generally to measurement of cross-inertia-device, and in particular, to a method and device for measuring cross-inertia-moment in a multiple axis LOS (line of sight) stabilizer applications.

2. Description of the Related Art

In general, cross-inertia-moment of a rotary body, such as an automobile's wheel balancer or textile machine's wheel balancer, is measured and calibrated to maintain high speed rotation. Such measurement of cross-inertia-moment in a high speed rotary machine is measured by using changes in the reaction force generated in a bearing that supports the angular rotary axis as the object to be measured is continuously rotated. Hence, by measuring the changes in the reaction force generated in the bearing and expecting the cross-inertia-moment of a high-speed machine or static unbalance amount of the rotary body, or the object to be measured based on the change, the rotary axis is finally calibrated.

Unfortunately however, the cross-inertia-moment measurement described above is not applicable to the angular rotary axis, particularly to multiple axis LOS stabilizer using multiple axis gimbals. That is, although the conventional measurement is applicable to a high-speed, unlimited rotatory machinery, it cannot measure the cross-inertia-moment in a limited rotatory machinery and does not work for low-speed rotary machinery, either.

SUMMARY OF THE INVENTION

The present invention is directed to a method and device for measuring cross-inertia-moment in a limited angular rotary axis, particularly, multiple axis gimbals.

Accordingly, there is provided the measuring device of cross-inertia-moment in a limited angular rotary axis, including: a base plate; a pair of first supporters, each end portion being secured on the base plate through a load cell, for supporting a first rotatory axis; a second supporter installed inbetween the first supporters to be able to rotate round the first rotatory axis, for supporting a second rotatory axis that is orthogonal to the first rotatory axis; and a roller installed inside of the second supporter, being rotatable round the second rotatory axis.

Another aspect of the present invention provides a measuring method of the cross-inertia-moment in a limited angular rotatory axis, the method including: (a) a first measuring procedure, including the substeps of: securing a first rotatory axis in a roller, wherein the roller includes the first rotatory axis that is supported by four load cells, a second rotatory axis that is orthogonal to the first rotatory axis and is rotatable round the first rotatory axis, and a third rotatory axis that is orthogonal to the first rotatory axis and the second rotatory axis, respectively, and is rotatable; applying sine wave vibration to the second rotatory axis; detecting signals outputted from each load cell by the applied vibration to the second rotatory axis; and calculating, based on the outputted signals from each load cell, moment and cross-inertia-moment for the first rotatory axis; (b) a second measuring procedure, including the substeps of: disposing, at the roller, the third rotatory axis to face the same direction with the first rotatory axis, and securing the first rotatory axis; applying sine wave vibration to the second rotatory axis; detecting signals outputted from each load cell by the applied vibration to the second rotatory axis; and calculating, based on the outputted signals from each load cell, moment and cross-inertia-moment for the third rotatory axis; (c) a third measuring procedure, including the substeps of: securing the second rotatory axis at the roller; applying sine wave vibration to the first rotatory axis; detecting signals outputted from each load cell by the applied vibration to the first rotatory axis; and calculating, based on the outputted signals from each load cell, moment and cross-inertia-moment for the second rotatory axis; (d) a fourth procedure, including the substeps of: disposing, at the roller, the third rotatory axis to face the same direction with the initial direction of the second rotatory axis, and securing the second rotatory axis; applying sine wave vibration to the first rotatory axis; detecting signals outputted from each load cell by the applied vibration to the first rotatory axis; and, calculating, based on the outputted signals from each load cell, moment and cross-inertia-moment for the third rotatory axis.

BRIEF DESCRIPTION OF THE DRAWINGS

The above features and advantages of the present invention will become more apparent from the following detailed description when taken in conjunction with the accompanying drawings in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

Figure 1:
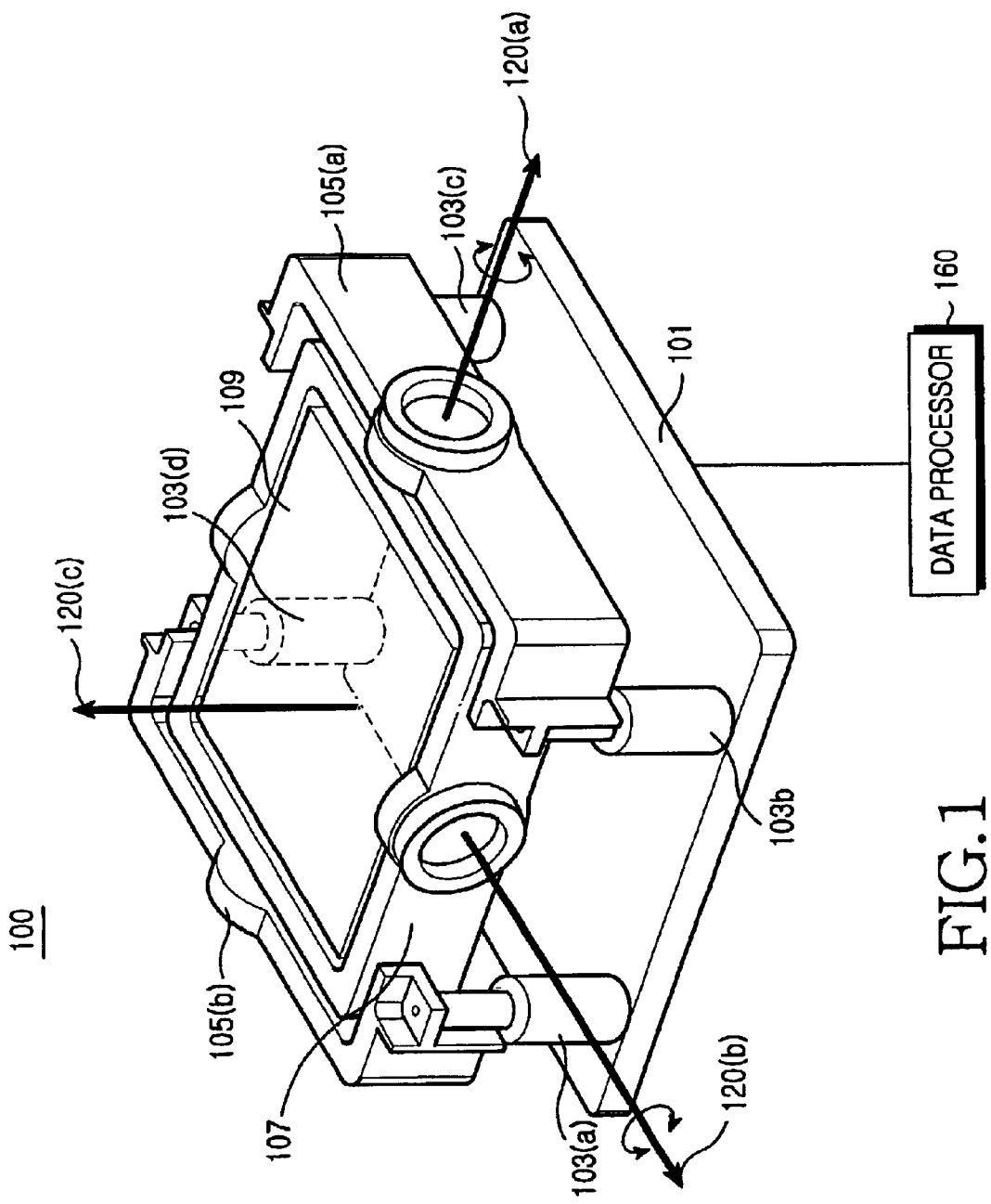
FIG. 1 is a diagram illustrating a measuring device of cross-inertia-moment in a limited angular rotatory axis in accordance with a preferred embodiment of the present invention.

FIG. 1 is a diagram illustrating a measuring device 100 of cross-inertia-moment in a limited angular rotatory axis in accordance with a preferred embodiment of the present invention. As shown in FIG. 1, the measuring device 100 of cross-inertia-moment in a limited angular rotatory axis in accordance with a preferred embodiment of the present invention includes a base plate 101, load cells 103a through 103d, a pair of first supporters 105a and 105b, a second supporter 107, and a roller 109, and calculates the cross-inertia-moment through a designated data processor 160.

The pair of first supporters 105a and 105b are disposed to face each other, each being supported by four load cells 103a through 103d that are secured at the base plate 101, and support the first rotatory axis 120a.

The load cells 103a–103d detect the reaction forces generated by the rotation of the second supporter 107 or the roller 109. Furthermore, the load cells 103a–103d are able to detect the reaction forces generated by a vibration applied to the first supporters 105a and 105b.

As shown in FIG. 1, the second supporter 107 is a hollow shaped frame disposed between the first supporters 105a and 105b and rotates round the first rotatory axis 120a. And the second supporter 107 supports the second rotatory axis 120b. Herein, the second support 107 rotates with respect to the first rotatory axis 120a. In addition, the second rotatory axis 120b is orthogonal to the first rotatory axis 120a. The roller 109 is disposed inside the second supporter and rotates round the second rotatory axis 120b. The third rotatory axis 120c is disposed on the top surface of the roller 109 to be orthogonal to the first and the second rotatory axis 120a and 120b, respectively.

As such, the third rotatory axis 120c is rotatable round the second rotatory axis 120b, as well as the first rotatory axis 120a as the second supporter 107 rotates round the first rotatory axis 120a. That is, the roller 109 is disposed in such manner that it can rotate biaxially The third rotatory axis 120c is vertically extended from the surface of the roller 109. The roller 109 is rotatable with respect to the second rotatory axis 120b. Therefore, the third rotatory axis 120c is rotatable with respect to the second rotatory axis 120b.

The second rotatory axis 120b supported by the second supporter 107 rotates with the second supporter 107 as the second supporter 107 rotates with respect to the first rotatory axis 120a. If the roller 109 is fixed to the second supporter 107 temporarily and the second supporter 107 rotates with respect to the first rotatory axis 120a, the third rotatory axis 120c is also rotatable with the second supporter 107 with respect to the first rotatory axis 120a.

Finally speaking, the third rotatory axis 120c is rotatable with respect to the first rotatory axis 120a as well as the second rotatory axis 120b.

During operation, when load is added onto the measuring device 100 of cross-inertia-moment in a limited angular rotatory axis, the load is transferred to the load cells 103a through 103d, and the load cells 103a through 103d outputs electric signals of electric resistance change that correspond to the load, and using the data processor 160, the measuring device 100 calculates the load added and the cross-inertia-moment. Herein, it is noted that a limited angular rotatory axis is a rotatory axis that the rotation angle is limited by mechanical stopper (not shown) to obtain the operational limited angle of the rotatory axis and safety, for example a rotatory axis of a steering wheel on an automobile.

Now, the measuring method using the cross-inertia-moment measuring device 10 described above is explained hereinafter with reference to FIGS. 2a through 2d.

Figure 2A:
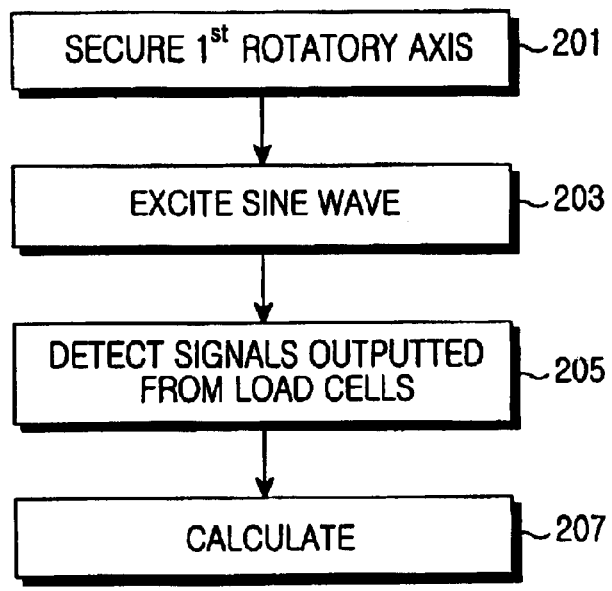
FIGS. 2a through 2d are flow charts illustrating a measuring method of cross-inertia-moment in a limited angular rotatory axis in accordance with the preferred embodiment of the present invention.

FIG. 2a illustrates the first measuring procedure (a) for measuring the cross-inertia-moment against the first rotatory axis 120a, when vibration is applied to the second rotatory axis 120b.

According to the first measuring procedure, the first rotatory axis 120a is secured 201 (S201) so that the second and the third axis 120b and 120c do not move freely. At this time, the third rotatory axis 120c is at the initial stage, that is, orthogonal to the first and the second rotatory axis 120a and 120b. Once the first rotatory axis 120a is secured, i.e., not moving, sine wave vibration is applied to the second rotatory axis 120b (S203). By the vibration applied to the second rotatory axis 120b, the load cells 103a through 103d are loaded, and the load cells 103a through 103d detect this load as electric signals (S205). The electric signals detected from the load cells 103a through 103d are inputted to the data processor 160, where the cross-inertia-moment is calculated (S207).

Here, the frequency of the sine wave vibration that was applied to the second rotatory axis 120b is designated as 7 Hz, the angular acceleration is designated as 1 rad/sec². The angular velocity of the sine wave vibration in such condition is 0.0227 rad/sec.

Under the conditions, the moment value is obtained using the following formula:

[Mathematical Formula 1]

$$M_1 = -I_{21} \times a_2 + I_{32} \times \omega_2^2$$

Here, $M_1$ is the moment against the first rotatory axis 120a; $I_{21}$ is the cross-inertia-moment against the first rotatory axis 120a, $\omega_2$ is the angular velocity of the sine wave vibration applied to the second rotatory axis 120b; $I_{32}$ is the cross-inertia-moment against the second rotatory axis 120b; and $a_2$ is the angular acceleration of the sine wave vibration applied to the second rotatory axis 120b. Among the aforementioned conditions for the sine wave vibration, the angular velocity $\omega_2$ can be disregarded because it is smaller than 1, and its square is also small enough to be neglected.

Therefore, the [Mathematical Formula 1] can be summarized as follows:

[Mathematical Formula 2]

$$I_{21} \approx M_1/a_2$$

On the other hand, the moment $M_1$ can be calculated by using the output values from the load cells 103a through 103d as follows:

[Mathematical Formula 3]

$$M_1 = [(Ic_3 + Ic_4) - (Ic_1 + Ic_2)] \times l_{23}$$

Here, $Ic_1$ through $Ic_4$ indicate the output values from the load cells 103a through 103d by the load added onto each load cell 103a through 103d. The $I_{23}$ indicates the distance between two load cells, particularly, the load cells 103b and 103c among those four load cells 103a through 103b. The distance is actually the same with the distance between the load cell 103a and the load cell 103d.

Based on the output values from the load cells 103a through 103d, the moment $M_1$ is obtained using the above formula, and the $M_1$ is substituted in [Mathematical Formula 2], where the $M_1$ is divided by the angular acceleration $a_2$ applied to the second rotatory axis 120b. In this manner, the cross-inertia-moment, $I_{21}$, is obtained.

Figure 2B:
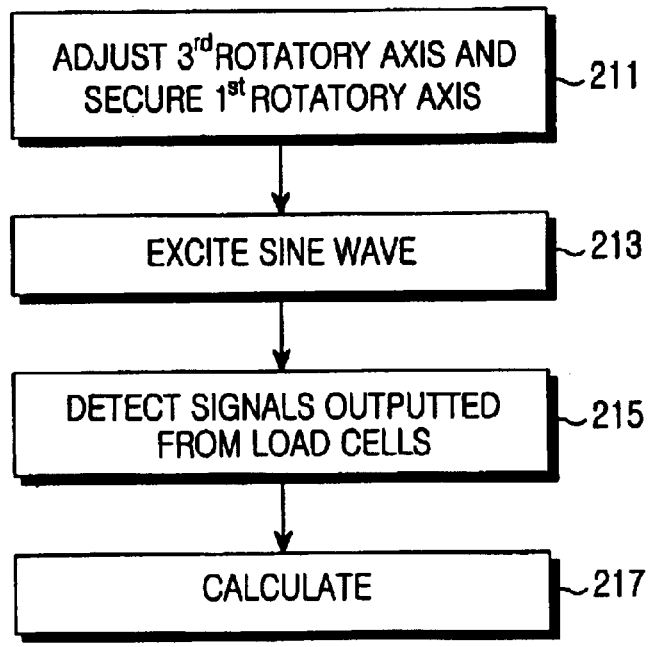

Next, FIG. 2b illustrates the second measuring procedure (b) for measuring the cross-inertia-moment against the third rotatory axis 120c, which is generated by the vibration applied to the second rotatory axis 120b.

According to the second measuring procedure (b), the third rotatory axis 120c is first adjusted to face the direction of the first rotatory axis 120a. Then, the first rotatory axis 120a is secured (S211) so that the second and the third rotatory axis 120b and 120c do not move freely round the first rotatory axis 120a. When the first rotatory axis 120a is secured, sine wave vibration is applied to the second rotatory axis 120b. By the vibration applied to the second rotatory axis 120b, the load cells 103a through 103d are loaded, and the load cells 103a through 103d detect this load as electric signals (S215). The electric signals detected from the load cells 103a through 103d are inputted to the data processor 160, where the cross-inertia-moment is calculated (S217).

Similar to before, the frequency of the sine wave vibration that was applied to the second rotatory axis 120b is designated as 7 Hz, the angular acceleration is designated as 1 rad/sec$^2$. The angular velocity of the sine wave vibration in such condition is 0.0227 rad/sec.

Under the condition, the moment value is obtained using the following formula:

[Mathematical Formula 4]

$$M_3 = -I_{21} \times \omega_2^2 - I_{32} \times a_2$$

The definition on each symbol is not provided here because the same definitions explained in the first measuring procedure (a) are applied to each symbol. Again, among the conditions, the angular velocity $\omega_2$ is disregarded because it is smaller than 1, and its square is also small enough to be neglected.

Therefore, the above formula can be summarized as follows:

[Mathematical Formula 5]

$$I_{32} \approx -M_3/a_2$$

In the meantime, the moment $M_3$ can be calculated by using the output values from the load cells 103a through 103d as follows:

[Mathematical Formula 6]

$$M_3[(lc_3+lc_4)-(lc_1+lc_2)] \times l_{23}$$

The definition on each symbol is not provided here because the same definitions explained in the first measuring procedure (a) are applied to each symbol.

Based on the output values from the load cells 103a through 103d, the moment $M_1$ is obtained using the above formula, and the $M_1$ is substituted in [Mathematical Formula 5], where the $M_3$ is divided by the angular acceleration $a_2$ applied to the second rotatory axis 120b. In this manner, the cross-inertia-moment, $I_{32}$, is obtained.

Figure 2C:
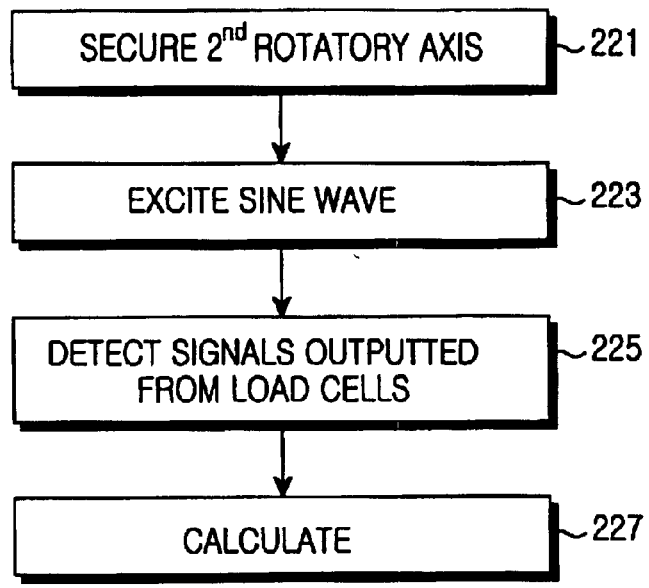

FIG. 2c illustrates the third measuring procedure (c) for measuring the cross-inertia-moment against the second rotatory axis 120b, which is generated by the vibration applied to the first rotatory axis 120a.

According to the third measuring procedure (c), the second rotatory axis 120b is secured (S221) so that the third rotatory axis 120b does not move freely round the second rotatory axis 120b. Preferably, the third rotatory axis 120c is disposed to face the direction of the first rotatory axis 120a. Once the second rotatory axis 120b is secured, sine wave vibration is applied to the first rotatory axis 120a (S223). By the vibration applied to the first rotatory axis 120a, the load cells 103a through 103d are loaded, and the load cells 103a through 103d detect this load as electric signals (S225). The electric signals detected from the load cells 103a through 103d are inputted to the data processor 160, where the cross-inertia-moment is calculated (S227).

Again, the frequency of the sine wave vibration that was applied to the second rotatory axis 120b is designated as 7 Hz, the angular acceleration is designated as 1 rad/sec$^2$. The angular velocity of the sine wave vibration in such condition is 0.0227 rad/sec.

Under the conditions, the moment value is obtained using the following formula:

[Mathematical Formula 7]

$$M_2 = -I_{21} \times a_1 - I_{13} \times \omega_1^2$$

The definition on each symbol is not provided here because the same definitions explained in the first measuring procedure (a) are applied to each symbol. Again, among the conditions, the angular velocity $\omega_1$ is disregarded because it is smaller than 1, and its square is also small enough to be neglected.

Therefore, the above formula can be summarized as follows:

[Mathematical Formula 8]

$$I_{21} \approx -M_2/a_1$$

Meanwhile, the moment $M_2$ can be calculated by using the output values from the load cells 103a through 103d as follows:

[Mathematical Formula 9]

$$M_2 = [(lc_2+lc_3)-(lc_1+lc_4)] \times l_{12}$$

The definition on each symbol is not provided here because the same definitions explained in the first measuring procedure (a) are applied to each symbol.

Based on the output values from the load cells 103a through 103d, the moment $M_1$ is obtained using the above formula, and the $M_1$ is substituted in [Mathematical Formula 8], where the $M_1$ is divided by the angular acceleration $a_2$ applied to the first rotatory axis 120a. In this manner, the cross-inertia-moment, $I_{21}$, is obtained.

Figure 2D:
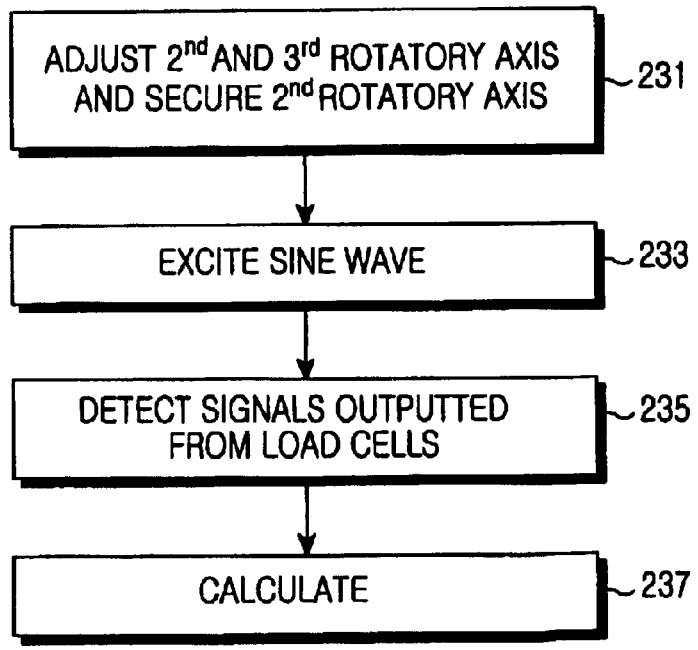

Lastly, FIG. 2d illustrates the fourth measuring procedure (d) for measuring the cross-inertia-moment against the third rotatory axis 120c, which is generated by the vibration applied to the first rotatory axis 120a.

According to the fourth measuring procedure (d), the third rotatory axis 120c is first adjusted to face the same direction of the second rotatory axis 120b. In this way, the second rotatory axis 120b is orthogonal to the plane including the first supporters 105a and 105b. When the third rotatory axis 120c is adjusted, the second rotatory axis 120b is secured (S231) so that the third rotatory axis 120b does not move freely round the second rotatory axis 120b. Preferably, the third rotatory axis 120c is disposed to face the direction of the first rotatory axis 120a. Once the second rotatory axis 120b is secured, sine wave vibration is applied to the first rotatory axis 120a (S233). By the vibration applied to the first rotatory axis 120a, the load cells 103a through 103d are loaded, and the load cells 103a through 103d detect this load as electric signals (S235). The electric signals detected from the load cells 103a through 103d are inputted to the data processor 160, where the cross-inertia-moment is calculated (S237).

Again, the frequency of the sine wave vibration that was applied to the second rotatory axis 120b is designated as 7 Hz, the angular acceleration is designated as 1 rad/sec$^2$. The angular velocity of the sine wave vibration in such condition is 0.0227 rad/sec.

Under the conditions, the moment value is obtained using the following formula:

[Mathematical Formula 10]

$$M_3 = I_{21 \times \omega 1}^2 - I_{13} \times a_1$$

The definition on each symbol is not provided here because the same definitions explained in the first measuring procedure (a) are applied to each symbol. Again, among the conditions, the angular velocity $\omega_1$ is disregarded because it is smaller than 1, and its square is also small enough to be neglected.

Therefore, the above formula can be summarized as follows:

[Mathematical Formula 11]

$$I_{13} \approx -M_3/a_1$$

On the other hand, the moment $M_3$ can be calculated by using the output values from the load cells as follows:

[Mathematical Formula 12]

$$M_3 = [(lc_2 + lc_3) - (lc_1 + lc_4)] \times l_{12}$$

The definition on each symbol is not provided here because the same definitions explained in the first measuring procedure (a) are applied to each symbol.

Based on the output values from the load cells 103a through 103d, the moment $M_3$ is obtained using the above formula, and the $M_1$ is substituted in [Mathematical Formula 11], where the $M_3$ is divided by the angular acceleration $a_2$ applied to the first rotatory axis 120a. In this manner, the cross-inertia-moment, $I_{13}$, is obtained.

Since the first through the fourth measuring procedures (a through d) are carried out independently, the order of procedures does not have to be the same with the embodiment of the present invention. In addition, the sine wave vibration that is applied to the first rotatory axis 120a and to the second rotatory axis 120b is preferably within range of from 6 to 10 Hz. The measurement is made under the experiment conditions of limited rotation and low speed rotation.

In conclusion, the present invention provides the measuring device and method of cross-inertia-moment in a limited angular rotatory axis, through which the cross-inertia-moment of multiple axis LOS stabilizer can be successfully measured or amended. Further, the present invention is also applicable to low speed rotatory machinery. Therefore, it is now possible to minimize the interference of the cross-inertia-moment due to the inertia in a precision stabilizer like the multiple axis LOS stabilizer, consequently improving the precision of the multiple axis LOS stabilizer.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A measuring device of cross-inertia-moment in a limited angular rotary axis, the device comprising:
    a base plate;
    a pair of first supporters, each end portion being secured on the base plate through a load cell, for supporting a first rotatory axis;
    a second supporter installed in between the pair of first supporters to be able to rotate round the first rotatory axis, for supporting a second rotatory axis that is orthogonal to the first rotatory axis; and
    a roller installed at the inside of the second supporter, being rotatable round the second rotatory axis.

2. The device as claimed in claim 1, further comprising a data processor for calculating cross-inertia-moment using the signals outputted from the load cells.

3. A measuring method of the cross-inertia-moment in a limited angular rotary axis, the method comprising:
    (a) a first measuring procedure, comprising the substeps of:
        securing a first rotatory axis in a roller, wherein the roller includes the first rotatory axis that is supported by four load cells, a second rotatory axis that is orthogonal to the first rotatory axis and is rotatable round the first rotatory axis, and a third rotatory axis that is orthogonal to the first rotatory axis and the second rotatory axis, respectively, and is rotatable;
        applying sine wave vibration to the second rotatory axis;
        detecting signals outputted from each load cell by the applied vibration to the second rotatory axis; and
        calculating, based on the outputted signals from each load cell, moment and cross-inertia-moment for the first rotatory axis;
    (b) a second measuring procedure, comprising the substeps of:
        disposing, at the roller, the third rotatory axis to face the same direction with the first rotatory axis, and securing the first rotatory axis;
        applying sine wave vibration to the second rotatory axis;
        detecting signals outputted from each load cell by the applied vibration to the second rotatory axis; and
        calculating, based on the outputted signals from each load cell, moment and cross-inertia-moment for the third rotatory axis;
    (c) a third measuring procedure, comprising the substeps of:
        securing the second rotatory axis at the roller;
        applying sine wave vibration to the first rotatory axis;
        detecting signals outputted from each load cell by the applied vibration to the first rotatory axis; and
        calculating, based on the outputted signals from each load cell, moment and cross-inertia-moment for the second rotatory axis;
    (d) a fourth procedure, comprising the substeps of:
        disposing, at the roller, the third rotatory axis to face the same direction with the initial direction of the second rotatory axis, and securing the second rotatory axis;
        applying sine wave vibration to the first rotatory axis;
        detecting signals outputted from each load cell by the applied vibration to the first rotatory axis; and
        calculating, based on the outputted signals from each load cell, moment and cross-inertia-moment for the third rotatory axis.

4. The method as claimed in claim 3, wherein frequency of the sine wave vibration that is applied to the first and the second rotatory axis is within range of from 6 to 10 Hz.

* * * * *